United States Patent
Robinson et al.

(10) Patent No.: US 6,693,810 B2
(45) Date of Patent: Feb. 17, 2004

(54) POWER SUPPLY AND BATTERY BACK-UP SYSTEM FOR TELECOMMUNICATIONS SYSTEMS

(75) Inventors: Steven M. Robinson, Madison, AL (US); John McGary, Petersburg, TN (US); Ralph R. Boudreaux, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/834,990

(22) Filed: Apr. 13, 2001

(65) Prior Publication Data

US 2002/0044462 A1 Apr. 18, 2002

Related U.S. Application Data

(60) Provisional application No. 60/197,236, filed on Apr. 14, 2000.

(51) Int. Cl.[7] ............................................. H02M 3/335
(52) U.S. Cl. ................................... 363/97; 363/21.01
(58) Field of Search ............................. 363/20, 21.01, 363/95, 97, 131; 307/64, 66

(56) References Cited

U.S. PATENT DOCUMENTS

| | | | |
|---|---|---|---|
| 4,860,185 A | * | 8/1989 | Brewer et al. ................ 363/41 |
| 5,324,990 A | * | 6/1994 | Cunningham ................ 307/125 |
| 5,576,941 A | * | 11/1996 | Nguyen et al. ................ 363/21 |
| 5,815,380 A | * | 9/1998 | Cuk et al. ..................... 363/16 |
| 5,909,360 A | * | 6/1999 | Lavin et al. ................... 363/21 |
| 6,359,794 B1 | * | 3/2002 | Real ............................. 363/17 |

* cited by examiner

Primary Examiner—Adolf D. Berhane
(74) Attorney, Agent, or Firm—Waddey & Patterson; Larry W. Brantley

(57) ABSTRACT

The present invention of a power supply and battery back-up system includes an AC/DC power supply and a battery for supplying operating power to a telecommunications system. The battery is connected to the telecommunications system and is designed to supply the telecommunications system with operating power if the power supply fails for some reason. The power supply is designed to output the peak operating power required by the telecommunications system, supplying the telecommunications system with whatever operating power it needs and supplying the difference between the operating power supplied to the telecommunications system and the peak operating power output by the power supply to the battery for charging. In one embodiment, the battery back-up system includes a battery monitoring circuit for monitoring the battery voltage and a relay connected between the battery and the telecommunications system for disconnecting the battery if the battery voltage falls below a pre-set level.

15 Claims, 3 Drawing Sheets

Simplified Schematic of New Power Supply / Battery Backup System

Conventional AC/DC Power Supply and Battery Backup System

Block Diagram of New Power Supply / Battery Backup System

Simplified Schematic of New Power Supply / Battery Backup System

POWER SUPPLY AND BATTERY BACK-UP SYSTEM FOR TELECOMMUNICATIONS SYSTEMS

This application claims the benefit of co-pending U.S. Provisional Patent Application Serial No. 60/197,236, filed on Apr. 14, 2000 and entitled "Modular System for Connecting Multiple Customer Premises Voice and Data Communications Devices to a T1 Data Line."

BACKGROUND OF INVENTION

The present invention relates in general to power supply systems and is more particularly related to AC power supply and battery back-up systems for telecommunications systems.

In many applications where T1 access devices are installed at a customer premise, there is a need for a separate AC power supply to power the device as well as an auxiliary battery back-up system to protect the operation of critical communications devices that are connected to the T1 in the event of a power failure. There are a wide variety of conventional AC power supplies and back-up systems available for this purpose. A block diagram of a typical combination AC power supply and battery back-up system 100 used in the prior art is shown in FIG. 1. The system 100 includes a conventional rectification and power conditioning section 101 having two outputs as shown. The first output (output 1) is connected to an electronic system (such as a T1 access system) to provide power to the system during normal operation. The first output is also linked to a monitoring and battery back-up relay control circuit 102. The monitoring/control circuit 102 monitors the first output to determine if the voltage being supplied to the electronic system is within specified parameters for the electronic system and, if not, sends a signal to the normally open relay circuit 103 to switch the battery 104 into the power circuit to the electronic system. The second output (output 2) is used to maintain a charge on the battery 104 and is connected to the battery 104 through a battery charge limiting circuit 105 and a battery disconnect relay 106. A battery monitoring circuit 107 monitors the condition of battery 104 and opens the normally closed relay 106 when the battery electrical parameters deviate from normal.

There are several weaknesses in the typical prior art system 100 as illustrated in FIG. 1. First, because the rectification/conditioning section 101 uses two separate outputs to supply load current to the telecommunications system and to supply charging current to the battery, the complexity (e.g., parts count) of the section is increased, which can add to the overall expense of the system 100. In addition, because the power supply is designed to have enough power capability to fully power the load and charge the battery simultaneously, the system 100 is actually capable of supplying more power than necessary when the telecommunications system draws less than its peak power requirements; something that occurs with telecommunications systems that provide ringing power to multiple voice phone lines.

Second, the separate charge limiting circuit 105 also increases the component count and power dissipation of the system 100. Third, the battery back-up function of the prior art system 100 is not entirely automatic because the battery 104 is not connected to the electronic system during normal operation. Rather, the monitoring and relay circuit 102 must be used to close the relay circuit 103 when an abnormal condition is detected at output 1.

Thus, there is a need for an improved and lower cost AC power supply and battery back-up system to power T1 interface devices as well as other communications equipment.

SUMMARY OF INVENTION

Accordingly, one object of the present invention is to provide an AC power supply and battery backup system having a single output.

Another object is to provide an AC power supply and battery back-up system that operates without a separate charge limiting circuit.

A further object of the present invention is to provide an AC power supply and battery back-up system that includes a battery that is automatically connected to the telecommunications system if the AC power supply fails to supply power to the telecommunications system.

Another object of the present invention is to provide an AC power supply and battery back-up system that takes advantage of the fact that the average power requirements for a telecommunications system are significantly less than the peak power requirements over a given time period.

These and other objects are satisfied by an AC power supply and battery back-up system that includes a power-limited, single output, AC/DC power supply, and a battery connected to the telecommunications system. The AC/DC power supply includes a full bridge rectifier connected to a flyback converter circuit and is designed to provide the peak power required by the telecommunications system. When the operating power requirements for the telecommunications system drop below the peak power output by the AC/DC power supply, the power supply uses the difference to supply charging power to the battery. Since the battery is already connected to the telecommunications system, it automatically supplies operating power to the telecommunications system if the AC input voltage to the power supply is lost. The AC/DC power supply also includes a peak current limiting circuit to limit the output power of the power supply when it is charging the battery. Finally, in one embodiment designed to protect the battery, the battery back-up system includes a battery monitoring circuit for monitoring the battery voltage and a relay connected between the battery and the telecommunications system for disconnecting the battery from the telecommunications system when the battery voltage drops too low.

DETAILED DESCRIPTION OF THE INVENTION

Figure 1:
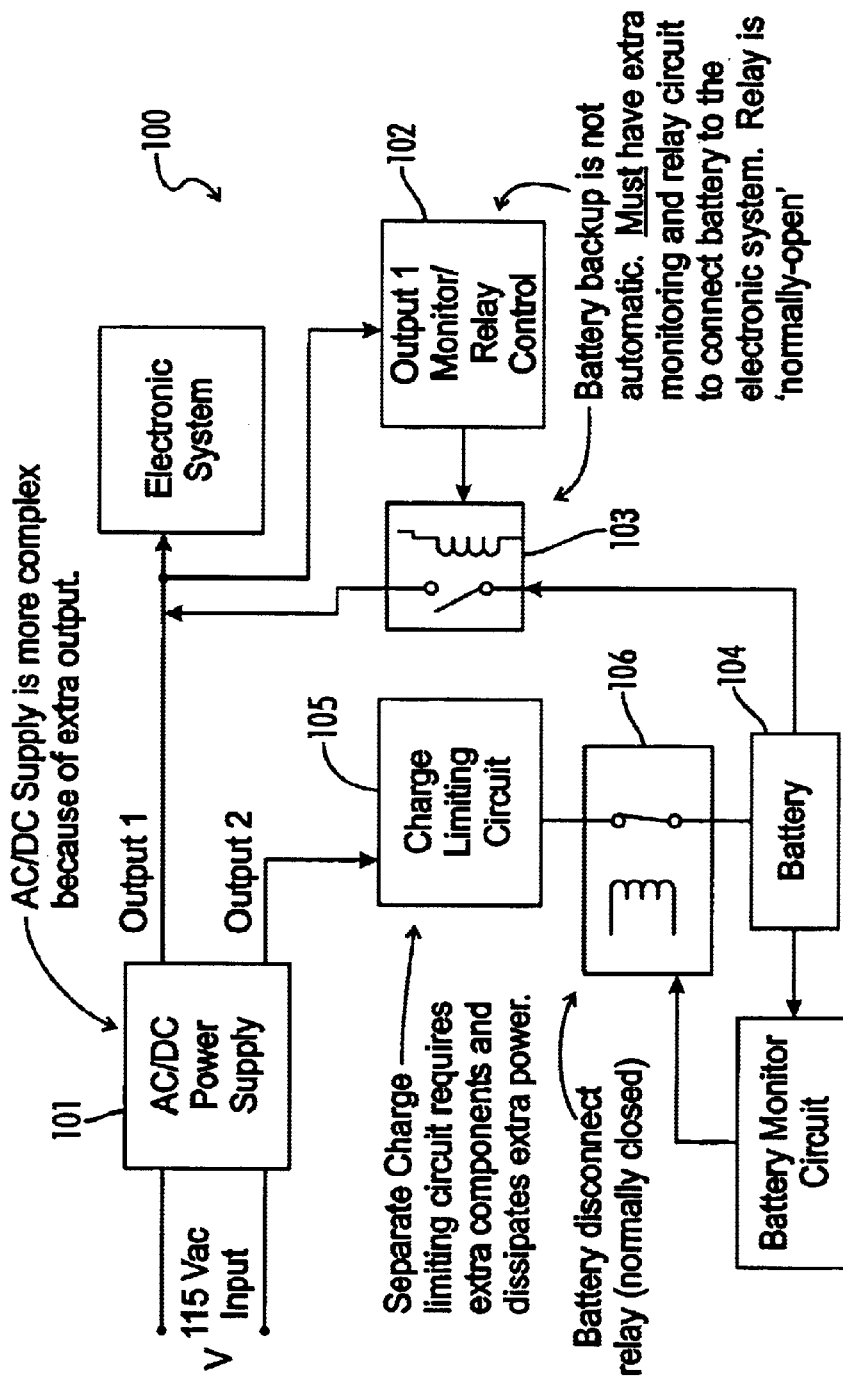
FIG. 1 is a block diagram of a typical AC power supply combined with a battery back-up system that is used in the prior art to power communications devices and systems, including T1 integrated access systems.

Referring to FIG. 1, many prior art battery back-up systems utilize separate powering channels for supplying load current to an electronic system, such as a telecommunications system, and supplying charging current to the battery. The battery charge channel is generally designed to be constant current or current limited and the power circuit is designed to have enough power capability to fully power the load and charge the battery simultaneously. However, if the load drawn by the electronic system statistically varies such that the average load over a 12 or 24 hour period is much less (half in some cases) than the peak load during the same interval, then the power to charge the battery can be incorporated in the difference between the peak and average load of the electronic system. Such is the case of a telecommunications system that provides (in addition to voice and data signaling) ringing power to multiple voice phone lines. The ringing signal is sinusoidal (or trapezoidal) with a 20 Hz frequency (for domestic USA) and is typically applied to each phone line with a cadence (2 seconds on and 4 seconds off is common). Further, the demand for ringing signal is highly statistical.

In addition to the power consolidation described above, if the separate charge control circuitry shown in FIG. 1 can be folded into the power supply circuit then the overall system cost and complexity is reduced resulting in a low cost, minimum size, maximum efficiency solution. The novel AC power supply and battery back-up system 200 shown in FIGS. 2 and 3 provides such a solution and can be used to power an electronic system.

Figure 2:
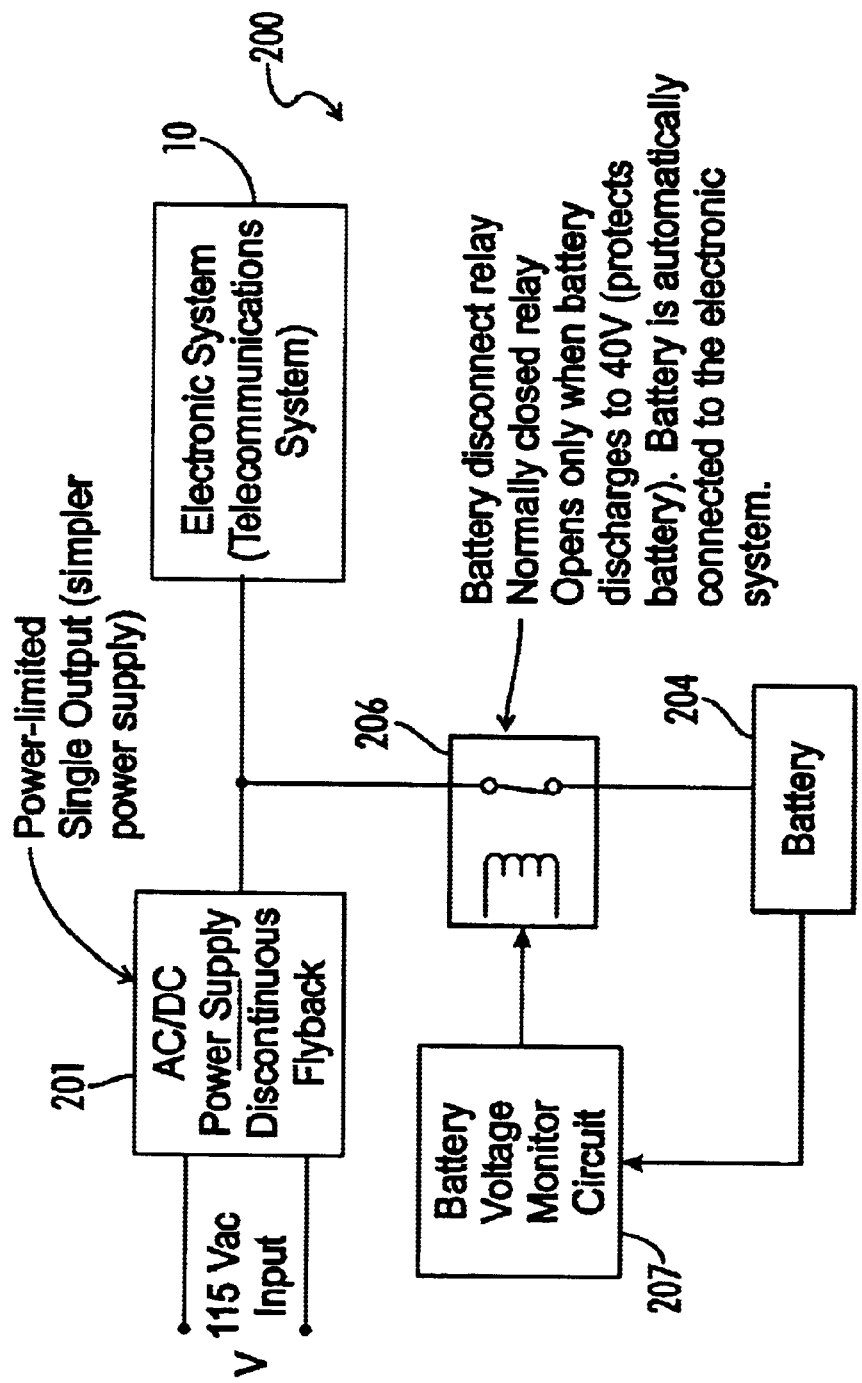
FIG. 2 is a block diagram of one embodiment of the AC power supply and battery back-up system of the present invention.

Looking first at FIG. 2, a rectification and power conditioning system 201 has an AC input connected to the 115 VAC utility network and a single DC output (power limited) connected to power the system 10. The DC output is also connected to a battery 204 (which operates in a float mode) through a normally closed relay circuit 206. The battery 204 receives charging power from the rectification and power conditioning stage 201 and supplies operating power to the system 10 when the rectification and power conditioning system 201 fails to supply power to the system 10. A battery voltage monitoring circuit 207 is also connected to the battery 204 as well as to the relay 206. The monitoring circuit 207 protects the battery 204 by causing the relay 206 to open when the battery voltage goes below a pre-set level. The telecommunications system 10 is designed to operate over the full battery voltage range (40 V to 54 V). Therefore, in one embodiment of the system 100, this pre-set level is 40 VDC. In the system 200 of FIG. 2, the battery 204 is connected directly across the power supply output lines and no additional charge control is required.

Figure 3:
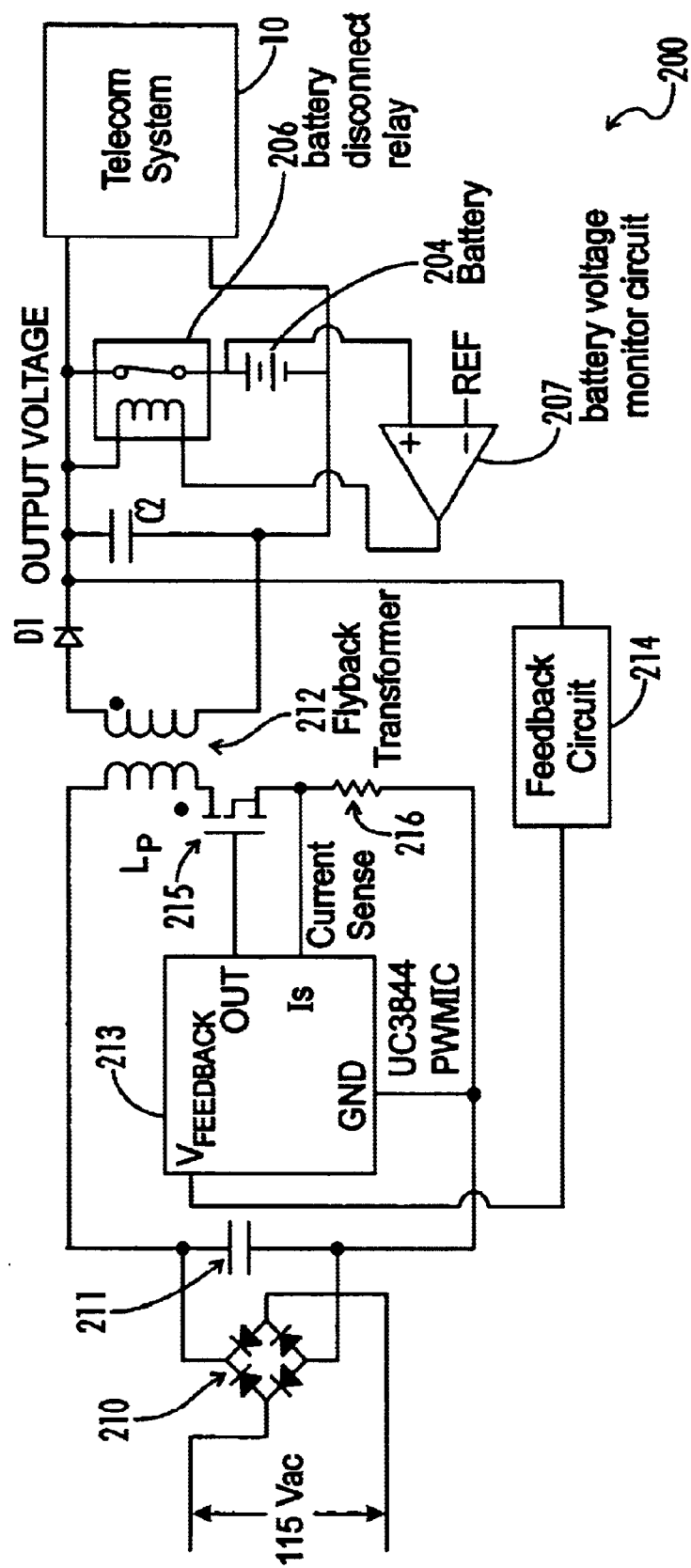
FIG. 3 is a simplified schematic of one embodiment of the AC power supply and battery back-up system shown in FIG. 2.

FIG. 3 provides more detail about the AC power supply and battery back-up system 200 of FIG. 2. The AC input is connected to a full bridge rectifier 210, which provides a DC voltage across smoothing capacitor 211. The voltage across the smoothing capacitor 211 is supplied to a flyback converter circuit comprising a flyback transformer 212, a control circuit 213, a feedback circuit 214, an electronic switch 215, and a current sense resistor 216 (i.e., a current sensor). The flyback converter circuit has long been recognized as a beneficial power supply circuit for its simplicity, low cost, and flexibility. When operated in the so-called discontinuous mode (that is, the magnetic flux in the flyback transformer begins each cycle at zero and ends each cycle at zero) and a fixed switching frequency, the output power of the flyback converter is limited to:

$$P_{out} = \frac{1}{2} * L_p * I_{pk}^2 * f_s$$

as long as the peak current is limited to $I_{pk}$.

In this analysis, $L_p$ is the primary inductance of the flyback transformer 212, $I_{pk}$ is the peak current of the flyback primary, and $f_s$ is the switching frequency.

The discontinuous flyback can be implemented in the AC power supply/battery back-up system 200 using a low cost, industry standard pulse-width modulation (PWM) integrate control circuit (IC) 213, such as the UC3844. The discontinuous flyback AC/DC circuit is scaled to provide peak power to the telecommunications system 10, which on average draws less than half peak power. During normal operation (AC power on, battery fully charged and floating with maintenance charging current only), the duty cycle of the PWM signal at the output of control circuit 213 varies in response to the feedback circuit 214 so that the power MOSFET switch 215 causes the output voltage measured at the junction of diode D1 and capacitor C2 to remain at a nominal 54 VDC. If AC input voltage is lost, the battery 204 is already connected to the telecommunications system 10 for immediate backup. When AC input voltage is restored, the output voltage measured at the junction of diode D1 and capacitor C2 is pulled down to the battery voltage (which is now lower due to supplying power to the telecommunications system 10). This output voltage is supplied to the feedback input of control circuit 213 through feedback circuit 214. In this mode, the output power is limited by a peak current limiting circuit integral to the control circuit 213 IC, as sensed at current sense resistor 216. The telecommunications system 10 and the battery 204 then split the available power, with the telecommunications system 10 getting what it needs for proper operation and the battery 204 getting the remainder for charging. The battery voltage (and thus the power supply output voltage) climbs as it is being charged. It eventually increases to 54 V and then the system comes out of power limit and again begins to regulate the output voltage using conventional PWM. No additional or special circuits are required to implement the battery charging and backup function. The elimination of additional charging circuitry and overhead power capacity reduces cost and overall size, and increases system efficiency.

The use of the present invention of an AC/DC power supply and battery back-up system in conjunction with a telecommunications system is described in applicant's co-pending U.S. Patent Application Serial No. 60/197,236, filed Apr. 14, 2000 and entitled "Modular System for Connecting Multiple Customer Premises Voice and Data Communications Devices to a T1 Data Line," the disclosure of which is incorporated herein by reference.

Although there have been described particular embodiments of the present invention of a Power Supply and Battery Back-up System for Telecommunications Systems, it is not intended that such embodiments be construed as limitations upon the scope of the invention except as set forth in the following claims.

What is claimed is:

1. A system, comprising:
   a telecommunications system having a power input terminal;
   a single output power supply having a power output coupled to the power input terminal for supplying power to the telecommunications system;
   a battery directly coupled to the power output of the power supply for supplying power to the telecommunications system when the power supply fails to supply power to the telecommunications system; and
   wherein the power supply is further operable to supply charging power directly to the battery when the power output by the power supply exceeds the operating power required by the telecommunications system.

2. The system of claim 1, wherein:

the telecommunications system requires a peak power and an average power; and the power supply is adapted to supply the peak power to the telecommunications system and to supply the difference between the peak power and the average power to the battery.

3. The system of claim 2, wherein the battery backup system includes:

a relay circuit connected between the power supply and the battery; and a battery voltage monitoring circuit connected to the relay circuit and the battery for monitoring the battery voltage and causing the relay circuit to open when battery voltage drops below a predetermined level.

4. The system of claim 3, wherein the power supply includes a control circuit for ensuring that the voltage output by the power supply remains constant during normal operation.

5. The system of claim 4, wherein the power supply includes a peak current limiting circuit for limiting the output power of the power supply when supplying charging power to the battery.

6. The system of claim 5, wherein the power supply includes:

a full bridge rectifier for converting an ac input voltage into an intermediate dc output voltage; and a flyback converter circuit connected to the full bridge rectifier and the telecommunications system for generating a dc output voltage that is electrically isolated from the ac input voltage.

7. The system of claim 6, wherein the flyback converter circuit includes:

a flyback transformer for electrically isolating the dc output voltage from the ac input voltage;

a control circuit connected to the flyback transformer for causing the flyback transformer to maintain the dc output voltage at a predetermined level; and a feedback circuit connected to the flyback transformer and the control circuit for sensing the value of the dc output voltage and generating a feedback signal used by the control circuit to cause the flyback transformer to maintain the dc output voltage at the predetermined level.

8. The system of claim 7, wherein the control circuit includes:

a pulse-width modulation control circuit for generating a pulse-width modulated signal; and an electronic switching device connected to the pulse-width modulation control circuit and the flyback transformer for causing the flyback transformer to maintain the dc output voltage at the predetermined level in response to the pulse-width modulated signal.

9. The system of claim 8, further comprising:

a current sensor for sensing current flowing in the flyback converter circuit and generating a current signal indicative of current flowing in the flyback converter circuit; and wherein the pulse modulation control circuit includes a peak current limit circuit connected to the current sensor for limiting the output power of the flyback converter circuit based on the current signal.

10. A power supply and backup system for a telecommunications system, comprising:

a single output power supply having a power output for supplying power to the telecommunications system;

a battery connected to the power output of the power supply for supplying power to the telecommunications system when the power supply fails to supply power to the telecommunications system; and wherein the power supply is further operable to supply charging power directly to the battery when the power output by the power supply exceeds the operating power required by the telecommunications system.

11. The system of claim 10, wherein the power supply includes:

a full bridge rectifier for converting an ac input voltage into an intermediate dc output voltage; and a flyback converter circuit connected to the full bridge rectifier and the telecommunications system for generating a dc output voltage that is electrically isolated from the ac input voltage.

12. The system of claim 11, wherein the flyback converter circuit includes:

a flyback transformer for electrically isolating the dc output voltage from the ac input voltage;

a control circuit connected to the flyback transformer for causing the flyback transformer to maintain the dc output voltage at a predetermined level; and a feedback circuit connected to the flyback transformer and the control circuit for sensing the value of the dc output voltage and generating a feedback signal used by the control circuit to cause the flyback transformer to maintain the dc output voltage at the predetermined level.

13. The system of claim 12, wherein the control circuit includes:

a pulse-width modulation control circuit for generating a pulse-width modulated signal; and an electronic switching device connected to the pulse-width modulation control circuit and the flyback transformer for causing the flyback transformer to maintain the dc output voltage at the predetermined level in response to the pulse-width modulated signal.

14. The system of claim 13, further comprising:

a current sensor for sensing current flowing in the flyback converter circuit and generating a current signal indicative of current flowing in the flyback converter circuit; and the pulse modulation control circuit includes a peak current limit circuit connected to the current sensor for limiting the output power of the flyback converter circuit based on the current signal.

15. The system of claim 14, wherein the battery backup system includes:

a relay circuit connected between the power supply and the battery; and a battery voltage monitoring circuit connected to the relay circuit and the battery for monitoring the battery voltage and causing the relay circuit to open when battery voltage drops below a predetermined level.

* * * * *